United States Patent [19]

Euverard et al.

[11] 4,030,620

[45] June 21, 1977

[54] APPARATUS AND METHOD FOR LOADING CONTAINERS

[75] Inventors: Maynard R. Euverard, Clarendon Hills; Henry A. Heide, Addison, both of Ill.

[73] Assignee: Velten & Pulver, Inc., Chicago Ridge, Ill.

[22] Filed: Dec. 15, 1975

[21] Appl. No.: 640,728

[52] U.S. Cl. .............................. 214/6 P; 53/163; 198/779; 214/6 DK; 214/152

[51] Int. Cl.² ......................................... B65G 57/16

[58] Field of Search ............... 214/6 DK, 6 P, 6 H, 214/152; 53/163, 245; 198/183, 779

[56] References Cited

UNITED STATES PATENTS

| | | | |
|---|---|---|---|
| 2,821,822 | 2/1958 | Mapes | 53/163 X |
| 2,830,416 | 4/1958 | Edwards et al. | 53/163 |
| 3,346,128 | 10/1967 | Hullhorst | 214/6 DK |
| 3,471,038 | 10/1969 | Verrinder | 214/6 DK |
| 3,653,178 | 4/1972 | Bauer | 53/163 X |
| 3,664,087 | 5/1972 | Choate et al. | 53/163 |
| 3,807,553 | 4/1974 | Billett et al. | 214/6 DK X |

FOREIGN PATENTS OR APPLICATIONS 254,046  10/1962  Australia ........................ 198/183

*Primary Examiner*—L. J. Paperner
*Attorney, Agent, or Firm*—Prangley, Dithmar, Vogel, Sandler & Stotland

[57] ABSTRACT

A loader including a support for holding at a loading station a container having openings in the bottom, a continuous conveyor having alternating conveyor sections and window sections passing by the loading station and disposed above and in registration with the support, a platen disposed beneath the support and carrying a plurality of pins extending upwardly and having the upper ends disposed in a plane, means for moving the pins to a receiving position with the upper ends extending through the openings in the container bottom and disposed immediately below the loading station and a depositing position wherein the pins are withdrawn from the openings in the container on the support, and structure for feeding a package onto one of the conveyor sections and off the conveyor section at the loading station and into and through the trailing window section to deposit the package gently upon the pins, whereby upon moving the pins to the depositing position the package is deposited in the container; also disclosed is a method of loading packages into a container.

30 Claims, 8 Drawing Figures

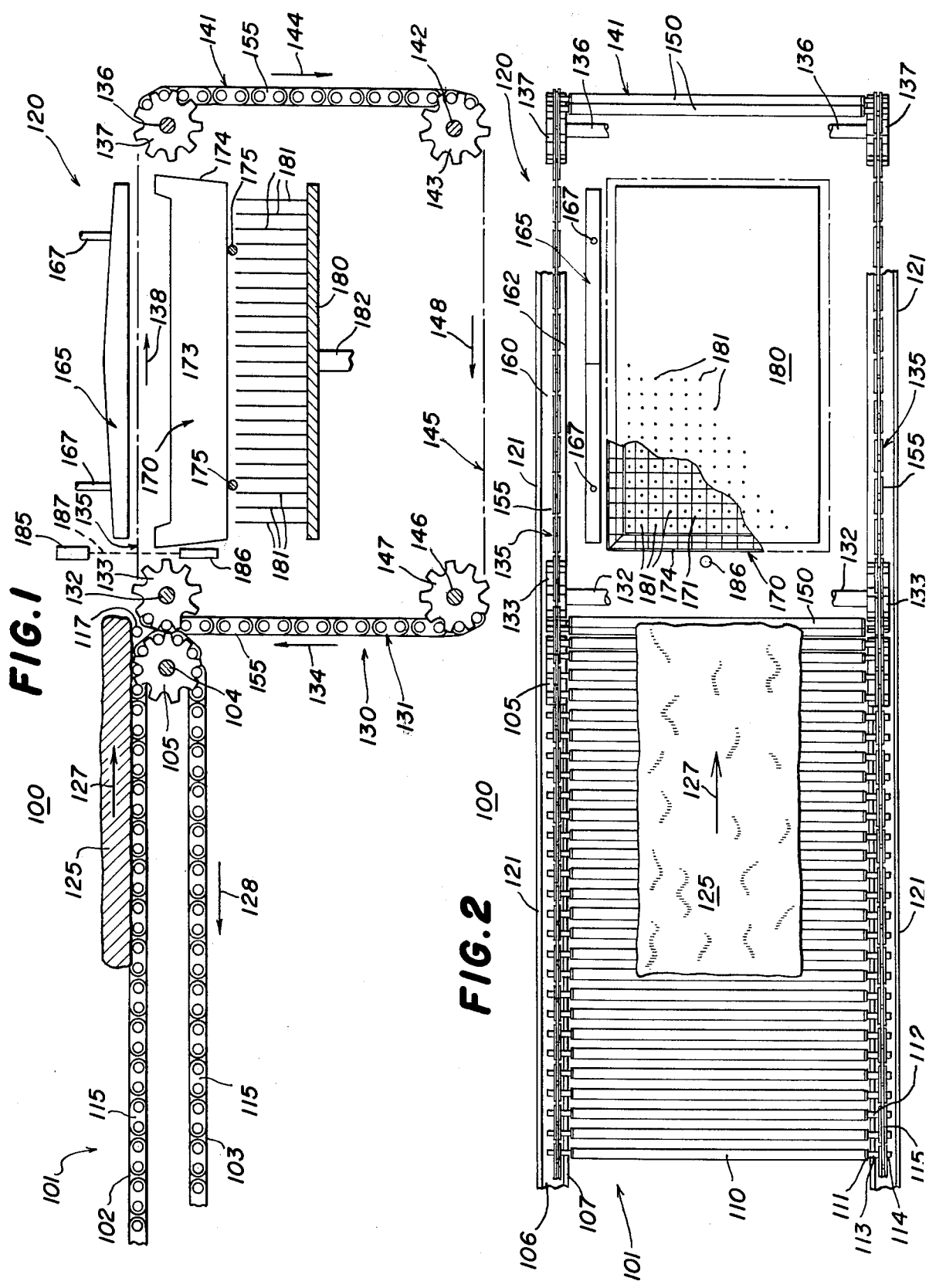

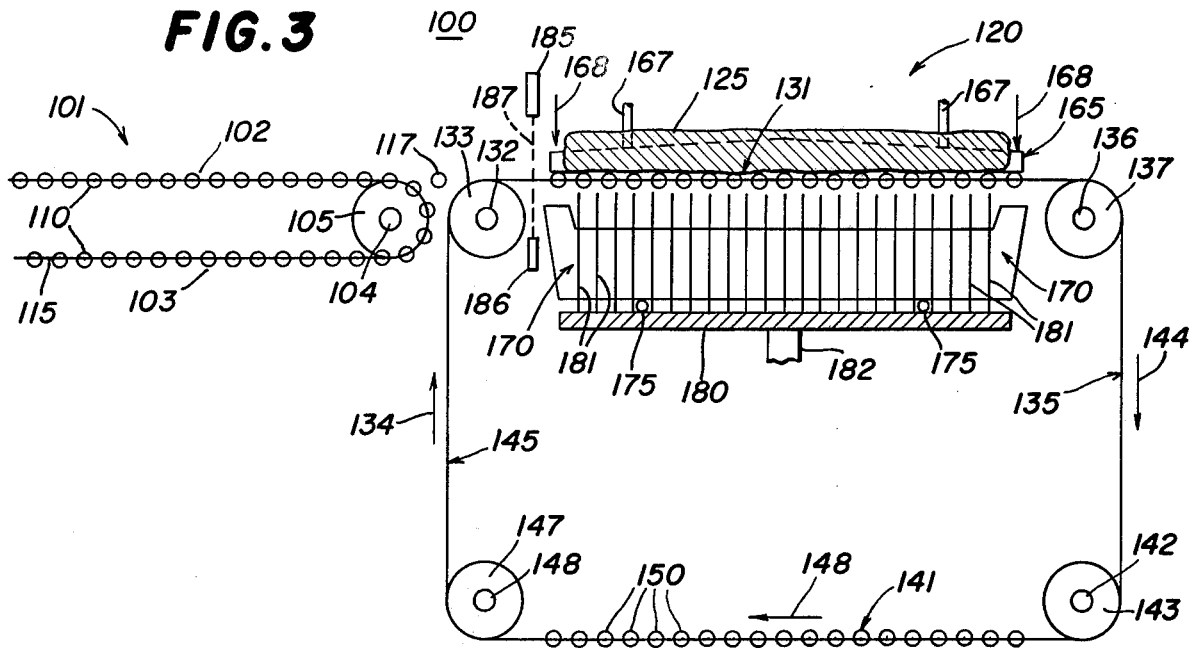
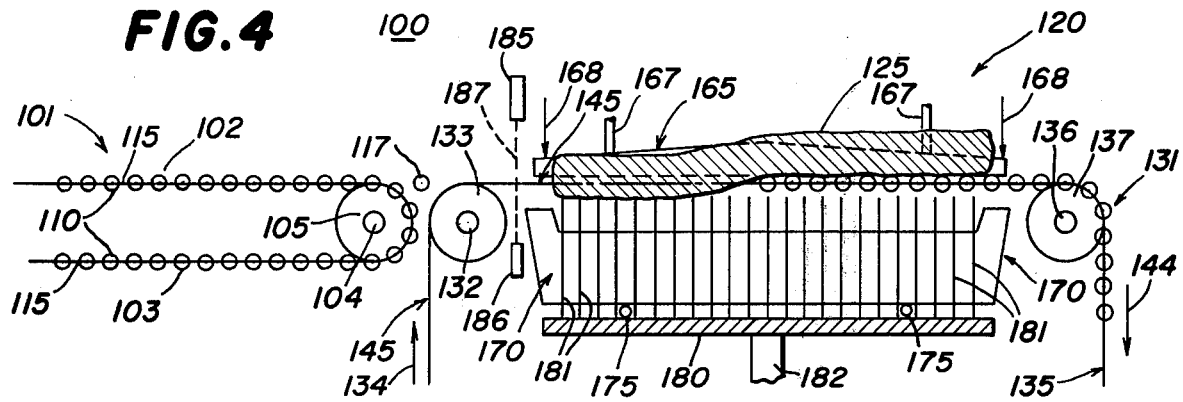
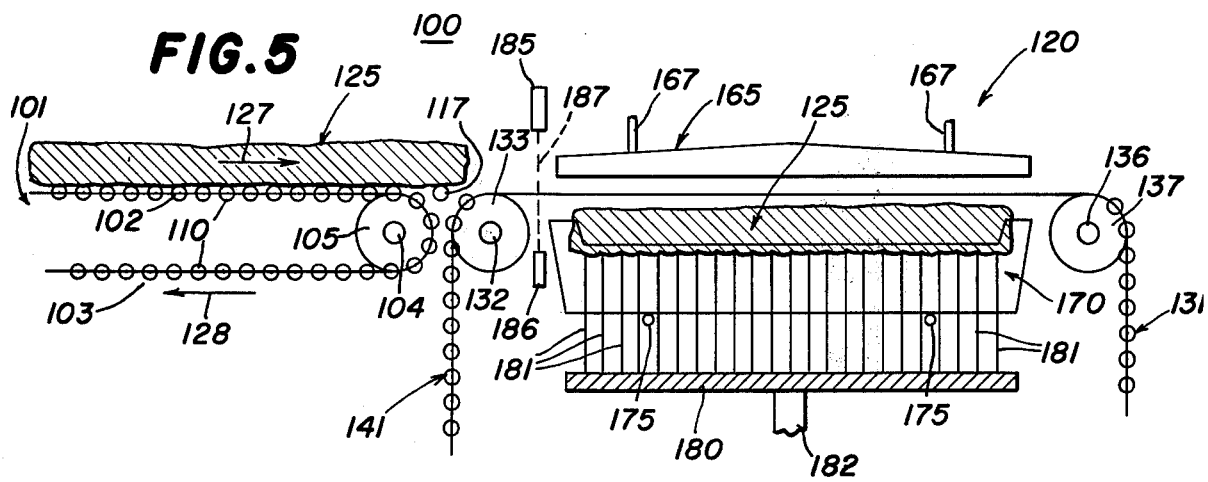

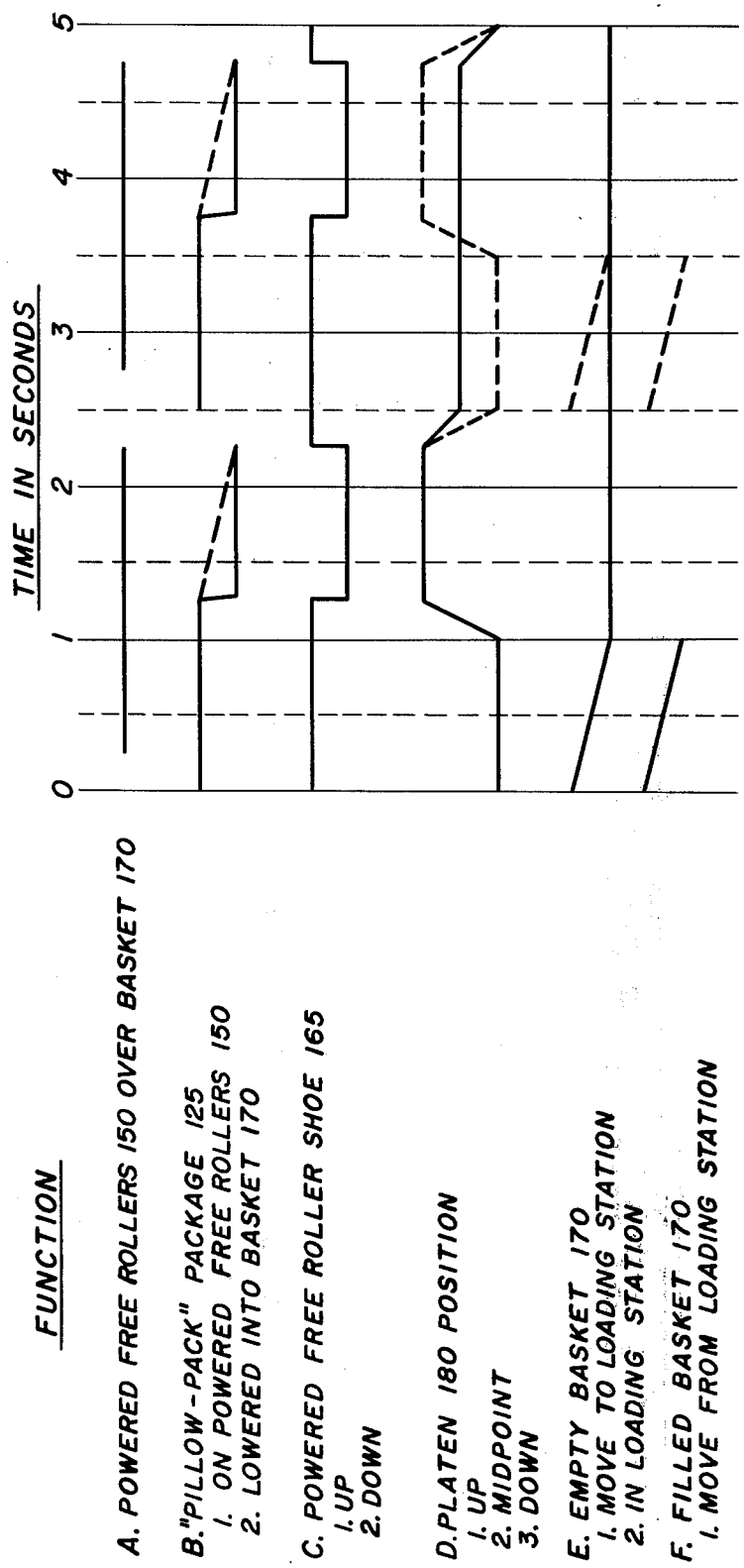

APPARATUS AND METHOD FOR LOADING CONTAINERS

BACKGROUND OF THE INVENTION

The present invention relates generally to improvements in loaders for and methods of loading packages into containers, and specifically loading into a container a pliable package of a plurality of fragile items to be maintained in a predetermined relation with respect to each other.

Standard loading apparatus and methods available currently are incapable of handling packages of delicate and fragile items wherein the items are to be maintained in a predetermined relation with respect to each other. An example of such a package is a "pillow-pack" of individual portions of packaged products such as hamburger buns. In such a typical package, 30 individual hamburger buns are arranged in 5 rows of 6 buns each, and the buns are in turn sliced horizontally, whereby to provide in effect 60 separate fragile items in a single package. These 60 items are surrounded by 2 sheets of plastic material such as polyethylene, the 2 sheets being heat sealed on all four sides with the top layer of plastic material slightly scored to facilitate easy opening at the point of use.

The package or "pillow-pack" of hamburger buns is carried from the bakery to the point of use in open topped plastic containers or baskets, usually with 2 of the packages of buns disposed in each basket, if the buns are sliced once, one of the packages being disposed on top of the other. In the case of thicker hamburger buns that are sliced twice, only one package is disposed in each basket.

It is essential that the package of buns be handled between the packaging station and the basket in such a manner as to maintain the two halves of each bun in registry with each other and to maintain the 5 rows of buns and maintain each of the 6 buns of each row in its appropriate row. If the top half of a bun is displaced or dislocated with respect to the lower half of the bun, then rapid drying of the interior of the bun takes place even though the bun is enclosed in the plastic material; however, if the top and lower halves are maintained in registry, there is no tendency of rapid drying of the interior surfaces of the bun.

SUMMARY OF THE INVENTION

The present invention provides a loader for and method of loading into a container or basket a set of grouped individual items to be maintained in a predetermined relation with respect to each other.

This is accomplished in the present invention, and it is an object of the present invention to accomplish these desired results, by providing a loader for depositing into a container having a plurality of openings in the bottom thereof a set of grouped individual items to be maintained in a predetermined relation with respect to each other, the loader comprising a support for holding a container in a loading station, a conveyor for transporting a set of grouped individual items to the loading station and disposed above the support and in general registration therewith, a plurality of upwardly extending pins disposed beneath the support and in general registration therewith and having the upper ends thereof disposed essentially in a common surface, means for moving the pins between a receiving position wherein the pins extend through the openings in an associated container on the support with the upper ends of the pins adjacent to and immediately below the loading station and a depositing position wherein the pins are withdrawn from the openings in the associated container on the support, and means for shifting the associated set of grouped individual items at the loading station from the conveyor when the pins are in the receiving position while maintaining the set of grouped individual items in general registration with the container on the support gently to transfer the set of grouped individual items onto the upper ends of the pins, whereby subsequent shifting of the pins to the depositing position gently deposits the set of grouped individual items in the container.

Another object of the invention is to provide a loader of the type set forth, wherein the conveyor includes a plurality of spaced-apart conveyor sections for transporting a set of grouped individual items to the loading position and a plurality of window sections disposed between the conveyor sections for dropping a set of grouped individual items therethrough.

Yet another object of the invention is to provide a loader of the type set forth, wherein the pin moving means moves the pins among an upper receiving position, a depositing position and a number of intermediate receiving positions disposed between the upper receiving position and the depositing position, the pins being lowered from the upper receiving position to an intermediate receiving position and between adjacent intermediate receiving positions a distance only slightly greater than the thickness of an associated set of grouped individual items, whereby to accommodate the loading of a plurality of superimposed sets of grouped individual items into a single container.

Yet another object of the invention is to provide a loader of the type set forth, wherein the conveyor includes a plurality of spaced-apart conveyor sections of interconnected free rollers, relative movement between the set of grouped individual items and the conveyor section supporting the set of grouped individual items at the loading station being accomplished by placing a shoe in contact with one end of the free rollers at the loading station to cause the rollers to operate to feed the set of grouped individual items into the adjacent trailing window section and off of the associated conveyor section.

In connection with the foregoing object, another object of the invention is to provide a sensing mechanism operable in response to the arrival of the set of grouped individual items in the loading station to cause the shoe to contact the free rollers.

Yet another object of the present invention is to provide a loader of the type set forth, wherein a stop is positioned adjacent to the forward end of the loading station for engaging the leading end of the associated set of grouped individual items so as to move the set of grouped individual items from the associated conveyor section and into and through the trailing window section as the conveyor section is moved from the loading station.

In connection with the foregoing object, it is another object of the invention to provide a loader wherein the stop can be moved between a retracted position and a stopping position, and wherein is further provided sensing means operable in response to the arrival of the set of grouped individual items in the loading station to cause the stop to be moved to the stopping position.

A further object of the invention is to provide a method of loading into a container having a plurality of openings in the bottom thereof a set of grouped individual items to be maintained in a predetermined relation with respect to each other, the method comprising the steps of providing at a loading station a container having a plurality of openings in the bottom thereof, carrying a set of grouped individual items on a conveyor section of interconnected powered free rollers into the loading station overlying and in general registry with the container, moving a plurality of upwardly extending pins upwardly through the openings in the bottom of the container so that the upper end of the pins are disposed just beneath the conveyor section, causing relative movement between the set of grouped individual items and the conveyor section to feed the set of grouped individual items off of the trailing end of the conveyor section gently to transfer the set of grouped individual items onto the upper end of the pins, and thereafter withdrawing the pins from the openings in the container gently to deposit the set of grouped individual items in the container.

Yet a further object of the invention is to provide a method of the type set forth including providing a conveyor having a plurality of spaced-apart conveyor sections of interconnected free rollers and a plurality of window sections disposed between the conveyor sections, and contacting the free rollers with a shoe at the loading station to cause the free rollers to move the set of grouped individual items into the adjacent trailing window section.

A still further object of the invention is to provide a method of loading in accordance with the present invention, including the step of providing a conveyor including a plurality of spaced-apart conveyor sections of interconnected free rollers and a plurality of window sections disposed between the conveyor sections, and contacting the leading end of the set of grouped individual items adjacent to the forward end of the loading station to move the set of grouped individual items into and through the trailing window section.

Further features of the invention pertain to the particular arrangement of the parts of the loader and the steps of the method of loading, whereby the above outlined and additional operating features thereof are attained.

The invention, both as to its organization and method of operation, together with further features and advantages thereof will best be understood with reference to the following specification taken in connection with the accompanying drawings.

BRIEF DESCRIPTION OF THE DRAWINGS

FIG. 1 is a side elevational view, with certain portions schematic and other portions broken away, illustrating a first preferred embodiment of a loader made in accordance with and embodying the principles of the present invention;

FIG. 2 is a plan view of the loader of FIG. 1 with certain parts broken away;

FIG. 3 is a diagrammatic view similar to FIG. 1 and illustrating the positions of the parts when a set of grouped individual items is in the loading station;

FIG. 4 is a diagrammatic view similar to FIG. 3, but showing the set of grouped individual items partially transferred onto the supporting pins at the loading station;

FIG. 5 is a view similar to FIG. 4 but showing the set of grouped individual items fully disposed upon the supporting pins at the loading station;

FIG. 8 is a diagram illustrating the positions of the various parts of the loader of FIG. 1 during a cycle of operation thereof.

DESCRIPTION OF THE PREFERRED EMBODIMENTS

Figure 6:
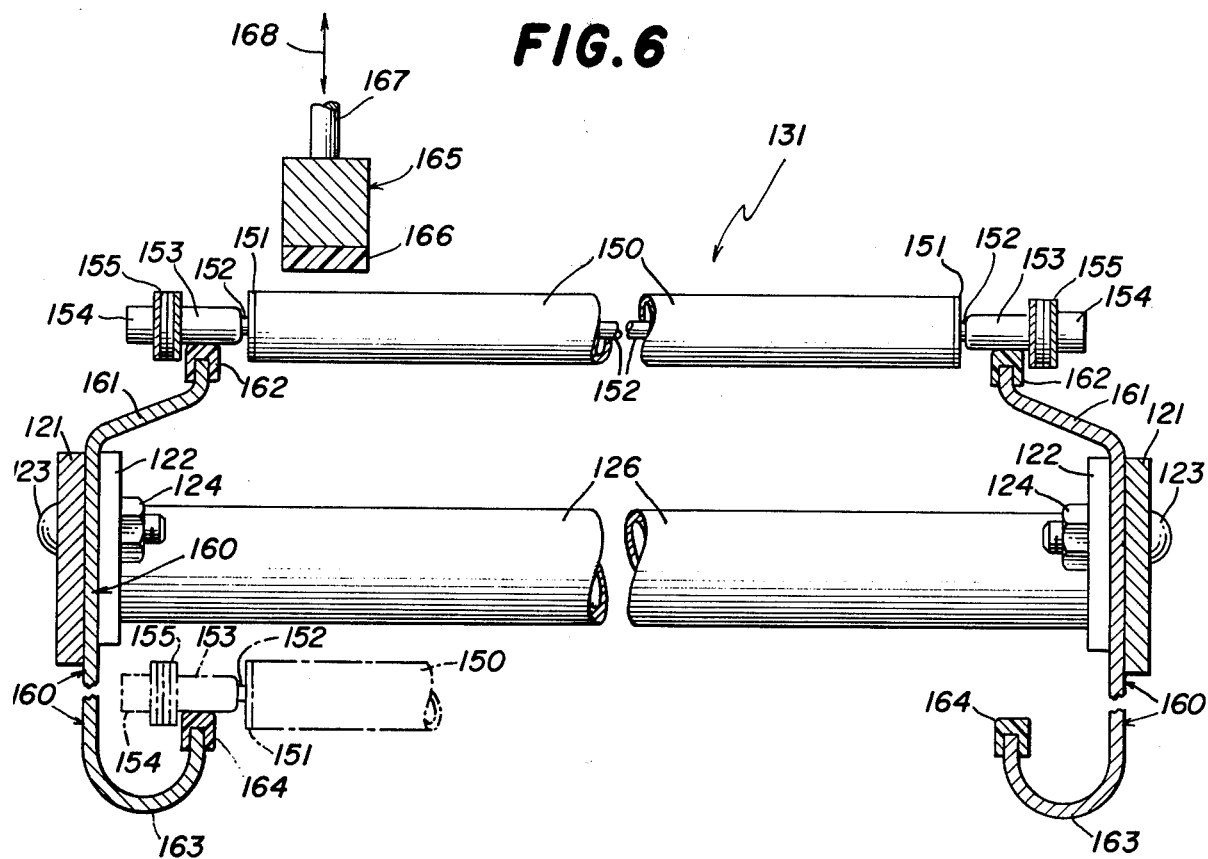
FIG. 6 is an enlarged view in vertical section with certain parts broken away through a conveyor section forming a part of the loader of FIG. 1.

Referring specifically to FIGS. 1 and 2 of the drawings there is shown a loading system generally designated by the numeral 100 that is made in accordance with and embodies the principles of the present invention. The loading system 100 includes an infeed conveyor 101 feeding packages 125 sequentially to a loader 120 which serves to stack one or more of the packages 125 in a plastic basket 170 supported at a loading station by basket supports 175.

In describing the present invention, the package 125 for illustrative purposes will be a package of hamburger buns wherein 30 of the hamburger buns are enclosed in a wrapping of a plastic, such as polyethylene or polypropylene plastic. The hamburger buns are the so-called "individual portion" type, i.e., each of the buns is separate and free and not connected to any adjacent bun. The buns are arranged in five rows with six buns in each row, whereby the package 125 contains thirty buns. In addition, the hamburger buns are sliced horizontally so as to eliminate the necessity of performing this operation at the point of use. As long as the upper half of a bun stays in registry with the lower half of a bun, there is no tendency for rapid drying of the interior surfaces of the bun. However, if the top half of the bun is dislocated with respect to the lower half of the bun, then rapid drying does take place even though the buns are wrapped in a plastic material. Two pieces of plastic are provided, one beneath the buns and one on top of the buns, and the four sides are heat sealed to form the completed package 125. The top sheet of plastic material may also be slightly scored to facilitate ease of opening of the package 125 at the point of use. It will be appreciated that the package 125 therefore contains 60 individual items, each of which is fragile and subject to drying out if displaced with respect to its mating bun half, whereby it is necessary and desirable that the 60 items in the package 125 are maintained in the desired predetermined relation with respect to each other, i.e., the two bun halves with respect to each other, and each bun with respect to the adjacent buns in the package 125.

Two of the packages 125 are placed in a basket in those cases wherein the buns are sliced once. In the case of thicker hamburger buns, these often are sliced twice across instead of once. In this case, it is customary that only one package be placed in each basket.

The present invention is also particularly useful when it is desired to load a set of individual items into a basket, the items being grouped, and it being desirable to maintain the items in the group in their respective relationship with respect to each other and with respect to the group. An example of such a use in the present invention is in the handling of sets of individual portion pies, each packaged in a square box, where a set of the individual boxes is to be loaded into a basket. Hereinafter, the phrase "set of grouped individual items" is to cover both products such as the package 125 and as well as sets of individual items which may not be surrounded by a plastic cover.

The package 125 is to be loaded into a basket or container 170, the basket 170 preferably being formed of a plastic. As illustrated, the basket 170 is rectangular in shape and has a bottom 171 provided with a plurality of openings in the bottom thereof, the openings being arranged in a predetermined pattern. Extending upwardly from the bottom 171 are two side walls 173 and two end walls 174 which are joined to the bottom 171 and to each other to form the completed basket 170.

Although the invention will be described in detail as applied to the handling of the package 125 containing hamburger buns in a so-called "pillow-pack," it is to be understood that the principles of the loading system 100 are also applicable to many other types of items that are to be loaded into a wide variety of shipping containers. Accordingly, it is to be understood that the following description is illustrative and is in no way to be considered a limitation of the use or application of the loading system 100 to the present invention.

Not only is the package 125 highly pliable because it is formed of a plurality of disconnected buns enclosed in sheets of plastic material, but it is also produced at a high rate in modern baking plants, whereby the packages 125 are presented to the loader 120 at a rate of about 24 packages per minute. Accordingly, the loader 120 must be designed and operated so as to accommodate this rate of flow of the packages 125 thereto.

Considering now the details of construction of the loading system 120, and referring first to the infeed conveyor 101, the infeed conveyor 101 includes an upper reach 102 and a lower reach 103 of what is essentially a continuous conveyor, although the left hand portion has been broken away for illustrative purposes. The conveyor includes a support shaft 104 carrying a pair of nylon sprockets 105, the shaft 104 being journaled in a conveyor frame generally designated by the numeral 106. The conveyor frame 106 also carries two spaced-apart rails 107, also formed of nylon, for supporting the reaches 102 and 103 of the infeed conveyor 102.

The conveyor 102 is more particularly comprised of a plurality of rollers 110 which are provided at either end thereof with a bearing 111, the bearings 111 receiving a rod 112 therethrough for supporting the roller 110. Each end of the rod 112 extends beyond the associated bearing 111 and carries a rod end bearing 113. The ends of the rods 112 are interconnected by links 115 held in position by bearing collars 114. The rod end bearings 113 rest upon the rail 107 along the upper reach 102 thereby the load imposed upon the rollers 110 is transferred through the rails 107 to the conveyor frame 106. The infeed conveyor 101 serves to feed the packages 125 in the direction of the arrow 127 at an appropriate rate to service the loader 120, the lower reach 103 moving in the direction of the arrow 128 in FIG. 1. There also is provided a bridging roller 117 between the right hand end of the infeed conveyor 101 and the input to the loader 120.

The loader 120 includes a main frame generally designated by the numeral 121 (see FIG. 6 also) which includes an inner frame member 122 between which is clamped a conveyor frame 160. More specifically, aligned openings are provided in the members 121, 122 and 160 to receive the shank of a bolt 123, the shank of the bolt 123 also having a nut 124 thereon holding the parts in the desired positions. Interconnecting the inner frame members 123 is a cross member 126 suitably secured thereto as by welding.

The loader 120 includes a loader conveyor generally designated by the numeral 130, the loader conveyor being continuous in nature and having a length of approximately 10 feet in an illustrative example of the loader 120. The conveyor 130 more particularly includes a conveyor section 131 disposed vertically and to the left in FIG. 1, a window section disposed clockwise or at the top and to the right in FIG. 1, a second conveyor section 141 disposed vertically and to the right in FIG. 1, and finally a second window section 145 disposed horizontally and at the bottom of FIG. 1. The conveyor 130 is supported by four shafts and the corresponding four pairs of sprockets, a first shaft 132 being disposed to the upper left in FIG. 1 and carrying two nylon sprockets 133, a second shaft 136 being disposed in the upper right and carrying a pair of nylon sprockets 137, a third shaft 142 being disposed to the lower right and carrying a pair of nylon sprockets 143, and a fourth shaft 146 being disposed to the lower left and carrying a pair of nylon sprockets 147. These several shafts and sprockets support the conveyor sections 131 and 141 and the window sections 135 and 145 for operative movement when driven by a prime mover (not shown) in a direction of the arrows 134, 138, 144 and 148. In a typical constructional example, the conveyor sections 131 and 141 have a length of approximately two feet, while the window sections 135 and 145 have a length of approximately three feet.

Referring to FIG. 6, the details of construction of one of the conveyor sections 131 are illustrated. The conveyor section 131 is made up of a plurality of powered free rollers 150 each provided at the opposite ends thereof with a bearing 151, the bearings 151 receiving a supporting rod 152 through openings therein. The ends of the rod 152 that extend beyond the bearings 151 carry rod end bearings 153 and outwardly of the bearings 153 are disposed links 155 held in position by bearing collars 154. The links 155 cooperate to form a continuous chain which extends completely around the loader conveyor 130 on each side thereof. The links 155 and associated parts may have the construction and arrangement illustrated in U.S. Pat. No. 2,753,039 granted July 3, 1956 to Frank X. Velten and W. Clark Pulver, or U.S. Pat. No. 2,969,870 granted Jan. 31, 1961 to W. Clark Pulver, or U.S. Pat. No. 3,214,007 granted Oct. 26, 1965 to William Matthies et al., or U.S. Pat. No. 3,237,756 granted March 1, 1966 to W. Clark Pulver. In addition, the chains employed at the end of the conveyor rollers 150 can be of the commercially available hollow pin type.

The conveyor frame members 160 are identical in construction and each includes an angle portion 161 extending inwardly toward the opposite frame member 160 and carrying thereon an upper rail 162 formed of nylon that engages the rod end bearings 153 on the adjacent ends of the rods 152 to support the rollers 150 and the materials carried thereon while passing across the upper reach of the loader conveyor 130. The conveyor frame members 160 also carry inwardly extending U-shaped portions along the lower edges thereof that in turn carry lower rails 164, also formed of nylon.

The rails 164 engage the rod end bearings 153 when the rollers 150 are moving along the lowermost reach of the loader conveyor 130.

As will be described more fully hereinafter, it is necessary to cause the free rollers 150 at the loading station to rotate in a counterclockwise direction as viewed in FIG. 1, and to this end there has been provided a shoe 165 that is mounted adjacent to one end of the rollers 150, and essentially overlying all rollers disposed along the upper reach of the loader conveyor 130 except for those immediately adjacent to the sprockets 133 and 137. The shoe 165 has a resilient pad 166 covering the lower surface thereof for engagement with the surfaces of the free rollers 150. Two support rods 167 are provided for moving the shoe 165 toward and away from the free rollers 150, the resilient pad 166 permitting the shoe 165 to be pressed firmly against the free rollers 150 to ensure rotation thereof as the loader conveyor 130 is driven in its usual path. The direction of motion of the shoe 165 is essentially vertically as illustrated diagrammatically by the arrows 168 in the several drawings.

In accordance with the present invention, there is provided a platen 180 that is essentially rectangular in plan view, see FIGS. 1 and 2 particularly, and carries thereon a plurality of upstanding pins 181 that are arranged in a regular pattern substantially covering the surface of the platen 180 and being adapted and arranged to extend through openings in the bottom 171 of an associated basket 170. More specifically, when a basket 170 is mounted upon its associated basket supports 175 as illustrated in FIG. 1, the pins 181 are adapted and arranged to extend upwardly through openings at the bottom 171 of the basket 170. In order to cause shifting of the platen 180 in a generally vertical direction, a support 182 has been provided that is connected to a source of motive power (not shown).

In order to cause actuation of the shoe 165 and the platen 180 in a proper timed relationship, a photocell 185 has been provided to detect when the trailing end of a package 125 is in the proper position with respect to the basket 170, and particularly to detect when the package 125 is centered over the basket 170. The photocell 185 is disposed between the sprockets 133 and the shoe 165 as viewed in FIG. 1. Associated with the photocell 185 is a light source 186 that establishes a light beam 187 directed upon the photocell 185. When the trailing end of a package 125 clears the light beam 187, a control mechanism (not shown) actuates the shoe 165 and the platen 180 to accomplish the loading of the package 125 into the basket 170, all as will be explained more fully hereinafter.

The operation of the loading system 100 to load the packages 125 into the basket 170 will now be described with particular reference to the diagrammatic FIGS. 3 to 5 and the function diagram of FIG. 8. Referring first to FIG. 1, the parts as shown therein are in the positions in which they are placed to being a loading sequence. A package 125 is positioned on the infeed conveyor ready for transfer to the conveyor section 131 on the loader conveyor 130. The infeed conveyor 101 is moving in the direction of the arrows 127 and 128, while the loader conveyor 130 is moving in the direction of the arrows 134, 138, 144, 148. A basket 170 is positioned on the supports 175 at the loading station, the shoe 165 is withdrawn upwardly and the pins 180 are withdrawn downwardly and in the depositing positions thereof.

As the conveyors 101 and 130 continue to operate, the leading end of the conveyor section 131 passes around the sprocket 133 and receives the leading end of the package 125 from the infeed conveyor 101. As the package 125 is continued to be fed onto the conveyor section 131, the leading edge of the package 125 interrupts the light beam 187 and conditions the mechanism for the loading operation. Eventually the package 125 reaches the position illustrated in FIG. 3, wherein the package 125 is entirely within the loading station and is in registration with the basket 170. Just before the package 125 reaches the position illustrated in FIG. 3, the trailing end thereof has cleared the light beam 187, which action is sensed by the photocell 185 which thereafter causes the shoe 165 to be moved downwardly to place the pad 166 in contact with the adjacent ends of the rollers 150, and the platen 180 is simultaneously raised so that the upper ends of the pins 181 reach the uppermost or upper receiving positions thereof simultaneously with the contact of the shoe 165 with the rollers 150.

Contact of the shoe 165 with the rollers 150 serves to rotate the rollers 150 in a counterclockwise direction as viewed in FIGS. 3 to 5 as the loader conveyor 130 continues to move in a generally clockwise direction. The counterclockwise rotation of the rollers 150 serves to feed the package 125 to the left relative to the rollers 150 as is diagrammatically illustrated in FIG. 4 of the drawings. More specifically, the trailing end of the package 125 is fed into the window section 145, and specifically the leading edge thereof so that the package 125 has the trailing end thereof gently dropped onto the upper ends of the pins 181 that are immediately beneath the rollers 150. As the conveyor 130 continues in its generally clockwise direction, the package 125 is gradually fed from the conveyor section 131 by the action of the shoe 165 on the rollers 150, thereby ultimately to place the package 125 completely upon and supported by the upper ends of the pins 181 as is diagrammatically illustrated in FIG. 5.

If only a single package 125 is to be loaded into the basket 170, the platen 180 is lowered to the position illustrated in FIG. 1, thus gently to deposit the package 125 onto the bottom 171 of the basket 170. It will be appreciated that the package will have been transferred from the infeed conveyor 101, onto the conveyor section 131 of the loader 120, and then from the conveyor section 131 onto the upper ends of the pins 181, and finally onto the bottom 171 of the basket 170 all while maintaining the hamburger bun halves in registration with each other and while maintaining the individual buns in the appropriate row and the rows in the appropriate relation to each other within the plastic covering of the package 125, this transfer also being done in a gentle and easy fashion so as to preclude any damage whatsoever to the fragile items contained within the package 125.

In certain cases it is desirable to load two of the packages 125 into the same basket 170. In that case, a second package 125 is fed onto the top of the package 125 already in the basket 170. To accomplish the loading of the second package 125 into the basket 170, the platen 180 is first withdrawn from the position illustrated in FIG. 4 to that illustrated in FIG. 5, the position of the pins 181 in FIG. 5 being an intermediate receiving position wherein the upper ends of the pins 181 have been lowered a distance slightly greater than the thickness of one of the packages 125. A second package 125 is now positioned on the infeed conveyor 101 adjacent to the loader 120 and the shoe 165 has been lifted so as to be out of contact with any rollers 150 passing thereby. The second package 125 is therefore fed upon the next conveyor section 141 from the infeed conveyor 101 in the same manner as was the first package described above fed onto the first conveyor section 131. As the trailing end of the second package 125 clears the light beam 187, the shoe 165 is lowered to contact the rollers 150 and the second package 125 is gently fed from the conveyor section 141 through the window section 135 and onto the upper surface of the first package 125 in the basket 170. When the second package 125 has been fully deposited upon the top of the first package 125, the platen 180 is lowered so as to withdraw the pins from the bottom of 171, of the basket 170, thus to deposit the two packages 125 within the basket 170, the pins 181 now being in the depositing positions thereof.

Once the desired number of packages 125 has been deposited in the basket 170, and the pins 181 fully lowered to the depositing positions thereof, the basket 170 with the package or packages 125 therein is quickly removed from the supports 175 and an empty basket 170 positioned thereon, whereby the parts are in readiness for depositing the next package 125 in the newly positioned basket 170.

A modern bakery in which the loader 120 is to be utilized operates at very high rates of production, whereby the loader 120 must likewise operate at a high rate, a typical rate of operation of the loader 120 being the loading of twelve baskets 170 with two of the packages 125 deposited in each basket, or 24 packages 125 being loaded in the twelve baskets each minute. It will be appreciated therefore that only five seconds are available to load two of the packages 125 into a basket 170 and to replace the loaded basket 170 with an empty basket 170. In a typical construction of the loader 120, this can be accomplished with a conveyor length of ten feet having two spaced-apart conveyor sections two feet in length with intervening window sections of three feet in length, the conveyor 130 operating at a velocity of 120 feet per minute.

There is illustrated in FIG. 8 of the drawings a function diagram further illustrating the operation of the loader 120. The top line labeled A illustrates the time that the free rollers 150 are in the loading position over the basket 170, the leading end of the conveyor section 131 or 141, as the case may be, arriving over the basket 170 after the elapse of 0.25 seconds and the trailing end of the conveyor section 131 or 141 clearing the loading station and the basket 170 after the elapse of 2.25 seconds; one half second elapses before the leading end of the next conveyor section 141 or 131 reaches the loading station over the basket 170 and the length of time required to remove the trailing end of the conveyor section 141 or 131 is the same as that of the first half of the cycle.

Line B of FIG. 8 illustrates that the leading end of the package 125 immediately is fed at the beginning of the cycle onto the rollers 150, it requiring 1.25 seconds completely to transfer the package 125 onto the rollers 150, after which the package 125 is fed from the rollers 150 and onto the upper ends of the pins 181, this latter operation requiring one second of cycle time. After the elapse of 0.25 seconds, the next package 125 is fed onto the next conveyor section and the cycle repeated and terminating 0.25 seconds before the end of the five-second cycle.

Line C shows the positions of the shoe 165, the shoe 165 initially being up or out of contact with the rollers 150 and being immediately lowered onto the rollers 150 after 1.25 seconds of cycle time, the shoe 165 being lowered onto the rollers 150 as soon as the package 125 is fully positioned upon the associated conveyor section 131 or 141. The shoe 165 remains in the down position for one second, the time required to transfer the package 125 from the conveyor section 131 or 141 onto the upper ends of the pins 181, and thereafter the shoe 165 is immediately moved to the up position and maintained therein until the second package 125 is fully positioned on the associated conveyor section 141 or 131, that being at 3.75 seconds into the cycle, at which time the shoe 165 is again lowered for one second and then raised 4.75 seconds into the cycle time.

Line D shows the position of the platen 180 and the pins 181 carried thereby, the platen 180 being placed in the up position when receiving the first package 125 thereon and, being placed in the midpoint position when receiving the second package thereon and being placed in the down position to deposit the packages 125 in the bottom of the basket 170. At the beginning of a cycle, the platen 180 is positioned downwardly with the pins 181 fully withdrawn from the associated basket 170. One second into the cycle, the platen begins movement upwardly and reaches the full up position just as the shoe 165 is placed into contact with the rollers 150. The platen 180 is then lowered to the midpoint position during the next 0.25 second of cycle time and is in the midpoint position and remains there while the second package is fed onto the conveyor section 141 or 131, and until the second package is deposited on top of the first package, which operation is completed after 4.75 seconds of cycle time. Thereafter the platen 180 is returned to the down position to begin the next cycle. If only a single package 125 is to be placed into each basket 170, then the cycle is altered as illustrated by dashed lins in line D so as to place a single package 125 in each of two baskets 170 within a single operating cycle comprising five seconds of total elapsed time.

Lines E and F show the positions respectively of an empty basket 170 and a filled basket 170, again the dashed line position illustrating the placing of a single package 125 in each of two baskets 170 during a five-second cycle, and the solid lines showing the operation when placing two of the packages 125 in a single basket 170.

Figure 7:
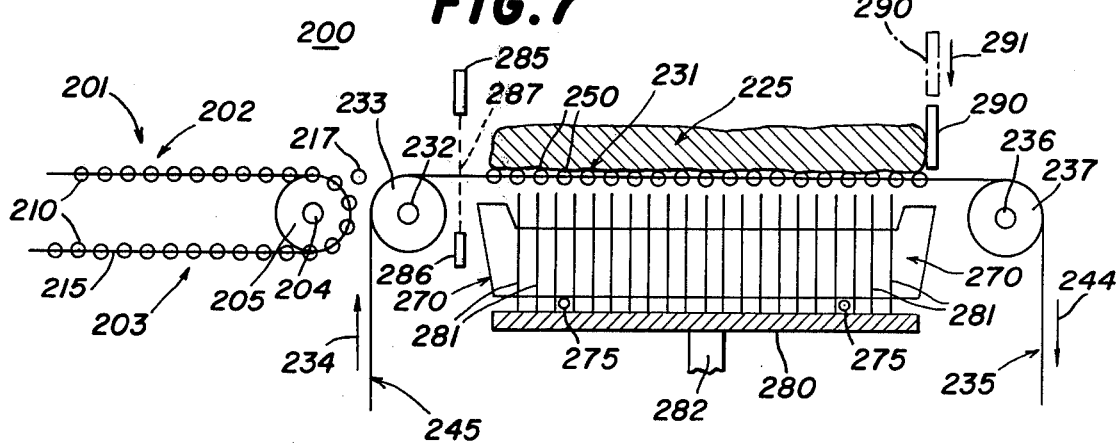
FIG. 7 is a diagrammatic view similar to FIG. 3 of a second embodiment of a loader made in accordance with and embodying the principles of the present invention.

There is illustrated in FIG. 7 of the drawings a second embodiment of a loading system 200 made in accordance with and embodying the principles of the present invention. Many of the parts of the loading system 200 are identical in construction and function to corresponding parts in the loading system 100, and to such parts numerals in the 200 series has been applied corresponding to the numerals in the 100 series applied to like parts in the loading system 100. There has been added to the loading system 200 a stop 290 which is shiftable between a raised position illustrated by dashed lines and a lower position illustrated by solid lines, the stop 290 being shiftable in the direction of the arrow 291 under the control of the mechanism operated by the photocell 285 and the sensing mechanism associated therewith and of which it forms a part.

The loading system 200 of FIG. 7 operates in essentially the same manner as does the loading system 100 of FIGS. 1 to 6. In the place of the shoe 165, the stop 290 has been provided, the stop 290 in the lower position illustrated in four lines in FIG. 7 engaging the forward end of the package 225 to hold the package 225 in the loading station while the conveyor 230 continues to run in the general clockwise direction. As a result of the stop 290 engaging the forward end of the package 225, the package 225 causes the rollers 250 to rotate thus to permit the conveyor section 231 to move out from under the package 225 and thus gently to deposit the package 225 upon the upper ends of the pins 281. All of the remaining parts of the loading system 200 operate in the same manner as the loading system 100, whereby the description of that operation will not be repeated.

Both the loader 120 and the loader 220 may advantageously be provided with an outfeed conveyor positioned adjacent to the sprockets 137 in the case of the loading system 100 and the sprockets 237 in the case of the loading system 200 to receive packages 125 or 225 if the loader 120 or 220 is not in condition for loading, whereby the packages would be carried through the loader 120 or 220 and onto the outfeed conveyor for handling in some other manner.

It also is contemplated that baskets 170 and 270 can be provided to accommodate more than two of the packages 125 and 225, in which case the platens 180 and 280 would be provided with a plurality of intermediate receiving positions rather than the single intermediate receiving position illustrated. This would permit the loaders 120 and 220 to load more than two packages into an associated basket, all while using the loading principles of the present invention.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A loader for depositing into a container having a plurality of openings in the bottom thereof a set of grouped individual items to be maintained in a predetermined relation with respect to each other, said loader comprising a support for holding a container in a loading station, a conveyor for transporting a set of grouped individual items to the loading station and disposed above said support and in general registration therewith, a plurality of upwardly extending pins substantially greater in number than the individual items disposed beneath said support and in general registration therewith and having the upper ends thereof disposed essentially in a common surface, means for moving said pins between a receiving position wherein said pins extend through the openings in an associated container on said support with the upper ends of said pins adjacent to and immediately below said loading station and a depositing position wherein said pins are withdrawn from the openings in the associated container on said support, and means for shifting the associated set of grouped individual items at said loading station from said conveyor when said pins are in said receiving position without lateral constraint of the associated set of grouped individual items while maintaining the associated set of grouped individual items in general registration with an associated container on said support gently to transfer the associated set of grouped individual items onto the upper ends of said pins, whereby subsequent shifting of said pins to said depositing position gently deposits the associated set of grouped individual items in the associated container while preserving the individual items therein and maintaining them in the predetermined relation with respect to each other.

2. The loader set forth in claim 1, wherein said support is constructed and arranged so as to leave unobstructed the openings in the bottom of a container supported thereby.

3. The loader set forth in claim 1, wherein said pins are arranged so as to be uniformly distributed through the bottom of the associated container and the associated set of grouped individual items to be supported thereby.

4. The loader set forth in claim 1, wherein the upper ends of said pins are disposed in a common plane arranged horizontally.

5. The loader set forth in claim 1, and further comprising a platen disposed beneath said support and in general registration therewith for carrying said pins to insure that said pins move together.

6. The loader set forth in claim 1, wherein said conveyor is a plurality of interconnected free rollers, and said means for shifting the associated set of grouped individual items at said loading position is a shoe engaging said free rollers to feed the associated set of grouped individual items off said conveyor as said conveyor moves.

7. The loader set forth in claim 1, wherein said conveyor is a plurality of interconnected free rollers, and said means for shifting the associated set of grouped individual items at said loading position is a stop engaging the leading end of the associated set of grouped individual items to hold the package in the loading position as said conveyor is moving therefrom.

8. The loader set forth in claim 1, and further comprising an infeed conveyor for feeding sets of grouped individual items onto said loader conveyor.

9. A loader for depositing into a container having a plurality of openings in the bottom thereof a set of grouped individual items to be maintained in a predetermined relation with respect to each other, said loader comprising a support for holding a container in a loading station, a conveyor including a plurality of spaced-apart conveyor sections for transporting a set of grouped individual items to the loading station disposed above said support and in general registration therewith and a plurality of window sections disposed between said conveyor sections for dropping an associated set of grouped individual items therethrough, a plurality of upwardly extending pins substantially greater in number than the individual items disposed beneath said support and in general registration therewith and having the upper ends thereof disposed essentially in a common surface, means for moving said pins between a receiving position wherein said pins extend through the openings in an associated container on said support with the upper ends of said pins adjacent to and immediately below said loading station and a depositing position wherein said pins are withdrawn from the openings in the associated container on said support, and means for shifting the associated set of grouped individual items at said loading station from the associated conveyor section and through the adjacent window section when said pins are in said receiving position without lateral constraint of the associated set of grouped individual items while maintaining the associated set of grouped individual items in general registration with an associated container on said support gently to transfer the associated set of grouped individual items onto the upper ends of said pins, whereby subsequent shifting of said pins to said depositing position gently deposits the associated set of grouped individual items in the associated container while preserving the individual items therein and maintaining them in the predetermined relation with respect to each other.

10. The loader set forth in claim 9, wherein said conveyor includes a generally horizontal reach with a longitudinal extent greater than one of said conveyor and window sections.

11. The loader set forth in claim 9, wherein said conveyor is continuous in structure with alternating conveyor sections and window sections throughout the length thereof.

12. The loader set forth in claim 9, wherein each of said conveyor sections comprises a plurality of interconnected free rollers, and said means for shifting the associated set of grouped individual items at said loading station is a shoe engaging said free rollers and serving to feed the associated set of grouped individual items off of said conveyor section as said conveyor moves past said loading station.

13. The loader set forth in claim 9, and further comprising, an infeed conveyor for feeding sets of grouped individual items onto said conveyor sections.

14. A loader for depositing into a container having a plurality of openings in the bottom thereof a set of grouped individual items to be maintained in a predetermined relation with respect to each other, said loader comprising a support for holding a container in a loading station, a conveyor including a plurality of spaced-apart conveyor sections for transporting a set of grouped individual items to a loading station disposed above said support and in general registration therewith and a plurality of window sections disposed between said conveyor sections for dropping an associated set of grouped individual items therethrough, a plurality of upwardly extending pins substantially greater in number than the individual items disposed beneath said support and in general registration therewith and having the upper ends thereof disposed essentially in a common surface, means for moving said pins among an upper receiving position wherein said pins extend through the openings in an associated container on said support with the upper ends of said pins adjacent to and immediately below said loading station and a depositing position wherein said pins are withdrawn from the openings in the associated container on said support and a predetermined number of intermediate receiving positions wherein the upper ends of said pins are spaced from said upper receiving position and the next higher intermediate receiving station a distance slightly greater than the thickness of an associated set of grouped individual items, and means for shifting the associated set of grouped individual items at said loading station from the associated conveyor section and through the adjacent window section when said pins are in one of said receiving positions without lateral constraint of the associated set of grouped individual items while maintaining the associated set of grouped individual items in general registration with an associated container on said support gently to transfer the associated set of grouped individual items onto the upper ends of said pins and an associated set of grouped individual items positioned thereon, whereby said subsequent shifting of said pins to said depositing position gently deposits the associated set of grouped individual items in the associated container while preserving the individual items therein and maintaining them in the predetermined relation with respect to each other.

15. The loader set forth in claim 14, and further comprising an infeed conveyor for feeding sets of grouped individual items to said conveyor sections.

16. A loader for depositing into a container having a plurality of openings in the bottom thereof a set of grouped individual items to be maintained in a predetermined relation with respect to each other, said loader comprising a support for holding a container in a loading station, a conveyor including a plurality of spaced-apart conveyor sections of interconnected free rollers for transporting a set of grouped individual items to the loading station and disposed above said support and in general registration therewith and a plurality of window sections disposed between said conveyor sections for dropping an associated set of grouped individual items therethrough, a plurality of upwardly extending pins substantially greater in number than the individual items disposed beneath said support and in general registration therewith and having the upper ends thereof disposed essentially in a common surface, means for moving said pins among an upper receiving position wherein said pins extend through the openings in an associated container on said support with the upper ends of said pins adjacent to and immediately below said loading station and a depositing position wherein said pins are withdrawn from the openings in the associated container on said support and a predetermined number of intermediate receiving positions wherein the upper ends of said pins are spaced from said upper receiving position and the next higher intermediate receiving station a distance slightly greater than the thickness of an associated set of grouped individual items, a shoe mounted adjacent to said loading station for engaging one end of said free rollers at said loading station, and sensing means operable in response to the arrival of an associated set of grouped individual items at the loading station in registration with an associated container on said support for causing said shoe to contact said free rollers to cause the associated set of grouped individual items to be fed into and through the adjacent window section without lateral constraint of the associated set of grouped individual items while said pins are in one of said receiving positions thus to maintain the associated set of grouped individual items in general registration with an associated container on said support, whereby subsequent shifting of said pins to said depositing position gently deposits the associated sets of grouped individual items in the associated container while preserving the individual items therein and maintaining them in the predetermined relation with respect to each other.

17. The loader set forth in claim 16, and further comprising an infeed conveyor for feeding sets of grouped individual items to said conveyor sections.

18. A loader for depositing into a container having a plurality of openings in the bottom thereof a set of grouped individual items to be maintained in a predetermined relation with respct to each other, said loader comprising a support for holding a container in a loading station, a conveyor including a plurality of spaced-apart conveyor sections of interconnected free rollers for transporting a set of grouped individual items to the loading station and disposed above said support and in general registration therewith and a plurality of window sections disposed between said conveyor sections for dropping an associated set of grouped individual items therethrough, a plurality of upwardly extending pins substantially greater in number than the individual items disposed beneath said support and in general registration therewith and having the upper ends thereof disposed essentially in a common surface, means for moving said pins between a receiving position wherein said pins extend through the openings in an associated container on said support with the upper ends of said pins adjacent to and immediately below said loading station and a depositing position wherein said pins are withdrawn from the openings in the associated container on said support, and a stop positioned adjacent to the forward edge of said loading station for engaging the leading end of an associated set of grouped individual items to position the associated set of grouped individual items in general registration with an associated container on said support thereby to move the associated set of grouped individual items into and through the trailing window section as the associated conveyor section is moved therefrom thus gently to transfer the associated set of grouped individual items onto the upper ends of said pins, whereby subsequent shifting of said pins to said depositing position gently deposits the associated set of grouped individual items in the associated container while preserving the individual items therein and maintaining them in a predetermined relation with respect to each other.

19. The loader set forth in claim 18, and further comprising an infeed conveyor for depositing sets of grouped individual items on said conveyor sections.

20. A loader for depositing into a container having a plurality of openings in the bottom thereof a set of grouped individual items to be maintained in a predetermined relation with respect to each other, said loader comprising a support for holding a container in a loading station, a conveyor including a plurality of spaced-apart conveyor sections of interconnected free rollers for transporting a set of grouped individual items to the loading station and disposed above said support and in general registration therewith and a plurality of window sections disposed between said conveyor sections for dropping an associated set of grouped individual items therethrough, a plurality of upwardly extending pins substantially greater in number than the individual items disposed beneath said support and in general registration therewith and having the upper ends thereof disposed essentially in a common surface, means for moving said pins among an upper receiving position wherein said pins extend through the openings in an associated container on said support with the upper ends of said pins adjacent to and immediately below said loading station and a depositing position wherein said pins are withdrawn from the openings in the associated container on said support and a predetermined number of intermediate receiving positions wherein the upper ends of said pins are spaced from said upper receiving position and the next higher intermediate receiving station a distance slightly greater than the thickness of an associated set of grouped individual items, a stop having a retracted position and a stopping position adjacent to the forward edge of said loading station and engaging the leading end of an associated set of grouped individual items to position the associated package in general registration with an associated container on said support thereby to move the associated set of grouped individual items into and through the adjacent window section as the associated conveyor section is moved therefrom, and sensing means operable in response to the arrival of an associated set of grouped individual items in the loading station in registration with an associated container on said support for moving said stop to the stopping position to cause the associated set of grouped individual items to be fed into and through the adjacent window section while said pins are in one of said receiving positions thus to maintain the associated set of grouped individual items in general registration with an associated container on said support, whereby subsequent shifting of said pins to said depositing position gently deposits the associated set of grouped individual items in the associated container while preserving the individual items therein and maintaining them in the predetermined relation with respect to each other.

21. A method of loading into a container having a plurality of openings in the bottom thereof a set of grouped individual items to be maintained in a predetermined relation with respect to each other, said method comprising the steps of providing at a loading station a container having a plurality of openings in the bottom thereof, carrying a set of grouped individual items on a powered conveyor section of interconnected free rollers into said loading station overlying and in general registry with said container, moving a plurality of upwardly extending pins substantially greater in number than the individual items upwardly through the openings in the bottom of said container so that the upper ends of said pins are disposed just beneath said conveyor section, causing relative movement between the set of grouped individual items and said conveyor section to feed the set of grouped individual items off of the trailing end of said conveyor section without lateral constraint of the associated set of grouped individual items gently to transfer the set of grouped individual items onto the upper ends of said pins, and thereafter withdrawing said pins from the openings in said container gently to deposit the set of grouped individual items in said container while preserving the individual items therein and maintaining them in the predetermined relation with respect to each other.

22. The method set forth in claim 21, wherein said conveyor section moves continuously.

23. The method set forth in claim 21, wherein said pins are completely withdrawn from the openings in said container, thereby to deposit a single set of grouped individual items in each container.

24. The method set forth in claim 21, wherein said pins are withdrawn after receiving a first set of grouped individual items a distance equal to the thickness of the first set of grouped individual items for receiving a second set of grouped individual items thereon, and thereafter said pins are completely withdrawn to load two sets of grouped individual items into the container.

25. The method set forth in claim 21, and further comprising the step of moving the loaded container from said loading station and placing an empty container at said loading station.

26. A method of loading into a container having a plurality of openings in the bottom thereof a set of grouped individual items to be maintained in a predetermined relation with respect to each other, said method comprising the steps of providing at a loading station a container having a plurality of openings in the bottom thereof, providing a conveyor including a plurality of spaced-apart conveyor sections of interconnected free rollers and a plurality of window sections disposed between said conveyor sections, carrying a set of grouped individual items on each of said conveyor sections into said loading station overlying and in general registry with said container, moving a plurality of upwardly extending pins substantially greater in number than the individual items upwardly through the openings in the bottom of said container so that the upper ends of said pins are disposed just beneath said conveyor section, contacting the free rollers with a shoe at said loading station when the set of grouped individual items is in registry with said container to cause said free rollers to move the set of grouped individual items relative to said conveyor section and into the adjacent trailing window section without lateral constraint of the associated set of grouped individual items gently to transfer the set of grouped individual items onto the upper ends of said pins, and thereafter withdrawing said pins from the openings in said container gently to deposit the set of grouped individual items in said container while preserving the individual items therein and maintaining them in the predetermined relation with respect to each other.

27. The method set forth in claim 26, and further comprising the step of sensing the arrival of a set of grouped individual items in the loading station in registration with said container and thereafter moving said shoe into contact with said free rollers.

28. A method of loading into a container having a plurality of openings in the bottom thereof a set of grouped individual items to be maintained in a predetermined relation with respect to each other, said method comprising the steps of providing at a loading station a container having a plurality of openings in the bottom thereof, providing a conveyor including a plurality of spaced-apart conveyor sections of interconnected free rollers and a plurality of window sections disposed between said conveyor sections, carrying a set of grouped individual items on each of said conveyor sections into said loading station overlying and in general registration with said container, moving a plurality of upwardly extending pins substantially greater in number than the individual items upwardly through the openings in the bottom of said container so that the upper ends of said pins are disposed just beneath said conveyor section, contacting the leading end of the set of grouped individual items adjacent to the forward end of said loading station with a stop to place the associated set of grouped individual items in general registration with an associated container on said support thereby to move the associated set of grouped individual items into and through the trailing window section as the associated conveyor section is moved therefrom thus gently to transfer the associated set of grouped individual items onto the upper ends of said pins, and thereafter withdrawing said pins from the openings in said container gently to deposit the set of grouped individual items in said container while preserving the individual items therein and maintaining them in the predetermined relation with respect to each other.

29. The method set forth in claim 28, and further comprising the step of sensing the arrival of the set of grouped individual items in the loading position in registration with said container on said support and thereafter causing said stop to contact the leading end of the set of grouped individual items.

30. A loader for depositing into a container having a plurality of openings in the bottom thereof a non-rigid package of grouped individual items to be maintained in a predetermined relation with respect to each other, said loader comprising a support for holding a container in a loading station, a conveyor including a plurality of spaced-apart conveyor sections for transporting a non-rigid package of grouped individual items to the loading station disposed above said support and in general registration therewith and a plurality of window sections disposed between said conveyor sections for dropping an associated package therethrough, a plurality of upwardly extending pins substantially greater in number than the individual items disposed beneath said support and in general registration therewith and having the upper ends thereof disposed essentially in a common surface, means for moving said pins between a receiving position wherein said pins extend through the openings in an associated container on said support with the upper ends of said pins adjacent to and immediately below said loading station and a depositing position wherein said pins are withdrawn from the openings in the associated container on said support, and means for shifting the associated package at said loading station from the associated conveyor section and through the adjacent window section when said pins are in said receiving position without lateral constraint of the associated package while maintaining the associated package in general registration with an associated container on said support gently to transfer the associated package onto the upper ends of said pins, whereby subsequent shifting of said pins to said depositing position gently deposits the associated package in the associated container while preserving the individual items therein and maintaining them in the predetermined relation with respect to each other.

* * * * *